United States Patent [19]

Wessel et al.

[11] 3,898,486

[45] Aug. 5, 1975

[54] STABILIZED THRESHOLD CIRCUIT FOR CONNECTION TO SENSING TRANSDUCERS AND OPERATION UNDER VARYING VOLTAGE CONDITIONS

[75] Inventors: Wolf Wessel; Harald Kizler, both of Schwieberdingen, Germany

[73] Assignee: Robert Bosch G.m.b.H., Stuttgart, Germany

[22] Filed: Sept. 13, 1973

[21] Appl. No.: 396,879

[30] Foreign Application Priority Data
Oct. 25, 1972   Germany............................ 2252185

[52] U.S. Cl. ............... 307/297; 307/254; 307/308; 328/1
[51] Int. Cl.² ........................................ H03K 17/60
[58] Field of Search ............ 307/254, 310, 229, 297; 330/23; 328/1-4; 73/26, 27 R, 27 A

[56] References Cited
UNITED STATES PATENTS

| | | | |
|---|---|---|---|
| 3,334,309 | 8/1967 | Murphy et al. ......................... | 328/2 |
| 3,376,431 | 4/1968 | Merrell ............................ | 307/297 X |
| 3,467,908 | 9/1969 | Burwen ................................ | 330/23 |
| 3,566,293 | 2/1971 | Recklinghausen .................... | 330/23 |
| 3,573,646 | 4/1971 | Dewit .................................. | 330/23 |
| 3,617,859 | 11/1971 | Dobkin ................................ | 330/23 |

Primary Examiner—Michael J. Lynch
Assistant Examiner—B. P. Davis
Attorney, Agent, or Firm—Flynn & Frishauf

[57] ABSTRACT

An emitter follower connected transistor is connected to the transducer; a reference voltage generator circuit is connected across the supply circuit, one terminal of the transducer being connected to the unregulated supply circuit, and a voltage divider is connected to a stabilized terminal of the reference voltage generator circuit to provide a tapped reference voltage for an operational amplifier which has one terminal stabilized, and the other terminal connected to the other terminal of the sensor, so that the operational amplifier will operate as a threshold switch. Preferably, a temperature compensation transistor (or other semiconductor) is connected in the voltage divider circuit to compensate for temperature-dependent changes in the emitter follower transistor.

5 Claims, 1 Drawing Figure

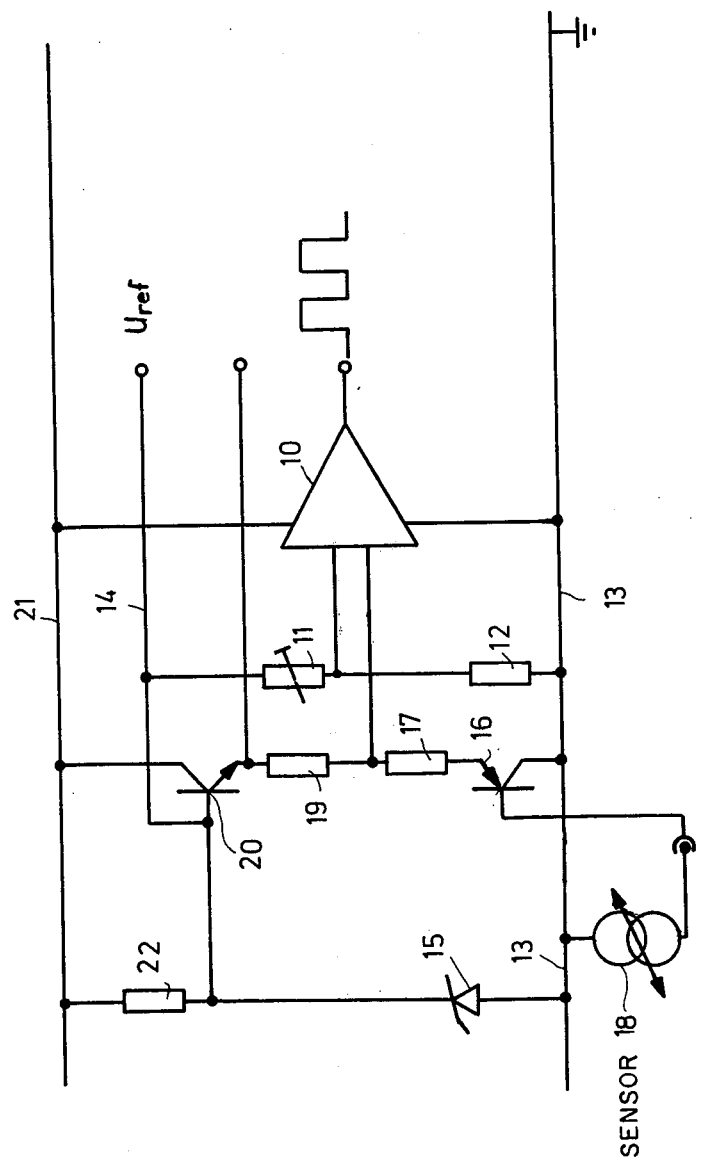

STABILIZED THRESHOLD CIRCUIT FOR CONNECTION TO SENSING TRANSDUCERS AND OPERATION UNDER VARYING VOLTAGE CONDITIONS

The present invention relates to a stabilized threshold circuit, and more particularly to a circuit to transform and derive an output signal from a sensing transducer, especially a sensing transducer located in the exhaust stream of an internal combustion engine.

To control the composition of fuel and air being applied to internal combustion engines, various sensors have been used and particularly sensors which are responsive to oxygen in the exhaust of internal combustion engines. These sensors, to sense oxygen in the exhaust gas, are located in contact with the exhaust gases and provide an output signal which is used to control a control system which, in turn, controls the relative mass of air and fuel of the air-fuel mixture being applied to the internal combustion engine. Such systems are shown, for example, in U.S. Pat. No. 3,827,237. A specific type of control system for which the present invention is applicable is described and claimed in copending application Ser. No. 399,261 filed Sept. 20, 1973 now U.S. Pat. No. 3,875,907.

Effective utilization of exhaust gas detoxification devices for internal combustion engines requires circuits and electronic systems which are particularly simple and sturdy, so that they can be used in the rough and unpredictable operating conditions which are inherent in mobile automotive use. Additionally, electrical circuits must be so constructed that they are practically immune to widely varying temperatures. It is particularly important in automotive use that temperature variations are effectively compensated. Additionally, automotive use requires stabilization of supply voltages since the automotive supply circuits are subject to wide swings in voltages and the control devices, particularly for exhaust emission, should be immune to voltage changes.

It is an object of the present invention to provide a circuit which provides a derived or modified output signal from a sensing gauge, which is effectively independent of automotive circuit supply variations and, preferably, additionally provides a stabilized voltage for subsequent controllers or control systems for exhaust emission control.

Subject matter of the present invention: Briefly, a threshold switch is provided, preferably in form of an operational amplifier. One input of the operational amplifier is connected, over an emitter-follower transistor to the output of the oxygen sensing element. The second input of the operational amplifier is connected to the tap point of a voltage divider which, in turn, is connected to a reference voltage supply circuit. One terminal, each, of the element which supplies the reference voltage supply, and of the oxygen sensor are connected to a common terminal of the supply line, preferably the negative, or ground or chassis line.

The invention will be described by way of example with reference to the accompanying drawing, wherein the single FIGURE is a schematic diagram of the stabilized circuit in accordance with the present invention.

A threshold switch, constructed as an operational amplifier 10 has one input connected to the tap point of a voltage divider formed of resistors 11, 12. The resistor 11 is a variable resistor, so that the threshold level of the operational amplifier 10 can be changed by changing the resistance value thereof. Resistor 12 is connected with one terminal to the ground, or chassis line, and with the other terminal to operational amplifier 10; resistor 11 is connected with one terminal to a supply bus 14, and with the other terminal to the operational amplifier 10. Supply bus 14 is a stabilized supply which is connected to the junction point between a Zener diode 15 and a resistor 22; the other terminal of resistor 22 is connected to an unregulated positive supply bus 21. The line 14, connected to the Zener diode 15 provides a reference voltage $U_{ref}$.

The second terminal of the operational amplifier 10 is connected to a transistor 16 connected as an emitter follower by means of an emitter resistor 17. The collector of transistor 16 is connected directly to chassis bus 13. The base of transistor 16 is connected to oxygen sensor 18. The other terminal of oxygen sensor 18 is connected to the common or chassis bus 13. The second input of the threshold switch 10 is further connected over an emitter resistance 19 to the emitter of a transistor 20. Transistor 20 has its base connected to the line 14, that is, to the Zener diode 15 supplying the reference voltage $U_{ref}$. The collector of transistor 20 is connected to positive bus 21.

Operation: Zener diode 15 provides a reference voltage. The voltage which is dropped across the voltage divider 11, 12, is thus very accurate, so that the threshold level of switch 10 can be accurately determined. The emitter follower 16, 17 provides an output voltage representative of the output voltage of the oxygen sensor 18; the emitter-base voltage of the transistor is added to the output voltage of the oxygen sensor. This voltage is temperature dependent. To compensate this temperature dependent voltage $U_{eb}$, transistor 20 is used. Emitter resistors 17, 19 of the transistors 16, 20, respectively, are identical. The input signal applied to the operational amplifier 10 from a junction point between resistors 17, 19 is thus effectively independent of temperature variations.

The threshold switch changes state at a predetermined output voltage of the oxygen sensor. The voltage at the junction between resistors 11, 12 compares the voltage at the junction of resistors 17, 19. If the voltage from sensor 18, which is connected over a usual type of cable connector to the base of transistor 16 changes over a predetermined level so that the input from the emitter-follower connected transistor 16 is less than the voltage between resistors 11, 12, then a negative difference voltage will appear at the operational amplifier and it will switch into a first state. If the voltage at the oxygen sensor 18 drops below the fixed threshold, a positive difference voltage will arise at the operational amplifier 10, connected as a threshold switch, and it will change in its second switching state. The output of the threshold switch 10 will provide a digital signal of substantial difference, depending on the state of the operational amplifier 10, and thus a clear and unambiguous indication is obtained if the output voltage of the oxygen sensor 18 is above or below the desired threshold level. This unambiguous switching signal can be transmitted to an electronic controller in order to control the relative proportion of air and fuel of the air-fuel mixture being applied to an internal combustion engine.

The circuit of the present invention is particularly suitable for combination with such systems, since the emitter of transistor 20 additionally provides a stabilized voltage which can be used to supply subsequent control circuits, not shown, and for example of the type cross referenced in the above identified co-pending application, U.S. Ser. No. 399,261.

The transistor 20 and its emitter resistor 19 can be replaced by the series circuit of a diode and a resistor in order to obtain temperature compensation. For effective temperature compensation, however, the voltage which is dropped over the diode should be equal to the emitter-base voltage of the transistor 16. In practical effect, therefore, the base-emitter diode junction of the transistor 20 is utilized merely as the single diode junction.

The operational amplifier 10 connected in the circuit as shown can be directly connected and does not require input phase compensation or suppression, since the comparison point, that is, the connection of the amplifier to the voltage divider 11, 12, is connected to a stabilized voltage, so that the amplifier 10 is essentially immune to spurious oscillations which might occur if both inputs thereto were to vary simultaneously.

Various changes and modifications may be made within the scope of the inventive concept.

We claim:

1. Stabilized threshold circuit to obtain a derived output signal from a gas composition sensing transducer (18) comprising
   a reference voltage generator circuit (15, 22) connected across the supply circuit (13, 21) and having stabilized reference output terminals (13, 14);
   a voltage divider circuit (11, 12) connected to the stabilized output terminals (13, 14) and thus to the reference voltage ($U_{ref}$) generated by said reference voltage generating circuit;
   an operational amplifier (10) connected as a threshold switch;
   an emitter follower transistor (16) having one terminal of the transducer (18) connected to the base thereof, one current supply terminal of the emitter follower transistor being connected to one terminal (13) of the supply circuit and the other current supply terminal being in circuit connection with said stabilized output terminal (14), the operational amplifier having one input connected to the tap point of the voltage divider circuit (11, 12) and the other input to the output of the emitter-follower connected transistor, the other terminal of the transducer (18) being connected to a stabilized output terminal (13) of the supply circuit;
   and a compensation semiconductor element (20) having a semiconductor junction, one terminal of said junction being connected to the reference voltage, a balancing resistor (19) connected in series with said junction with one terminal thereof, and to the main current path of the emitter follower transistor (16) with the other terminal thereof, to provide a stabilized voltage thereto, the junction characteristics of the compensation semiconductor element being similar to the junction characteristics of the semiconductor junctions of the emitter-follower transistor (16).

2. Circuit according to claim 1 wherein the temperature compensation semiconductor element is a transistor (20) having its base controlled by the reference voltage, the collector-emitter circuit of said compensation transistor (20) being connected in series with the collector-emitter circuit of the emitter follower transistor (16);
   and both the compensation transistor (20) and the emitter follower transistor (16) having emitter resistors (17, 19) of equal value, at least one of which forming said balancing resistor, one terminal of which is connected to the respective emitter, and the other terminals being connected together, said other connected terminals being further connected to said other input of the operational amplifier (10).

3. Circuit according to claim 2 further comprising a stabilized voltage supply connection connected to the emitter of the compensation transistor (20).

4. Circuit according to claim 1 wherein said reference voltage generator circuit comprises a resistor (20) and a Zener diode (15) connected in series and across the supply circuit (21, 13).

5. Circuit according to claim 4 further comprising a reference voltage supply connection connected to the junction between the resistor (22) and the Zener diode (15).

* * * * *